Clover Huller.
ASA BURCESS & HIRAM BALDWIN
Patented 10th October 1834.
10-10-1834
CLASSIFICATION
8445½X
DIVISION.
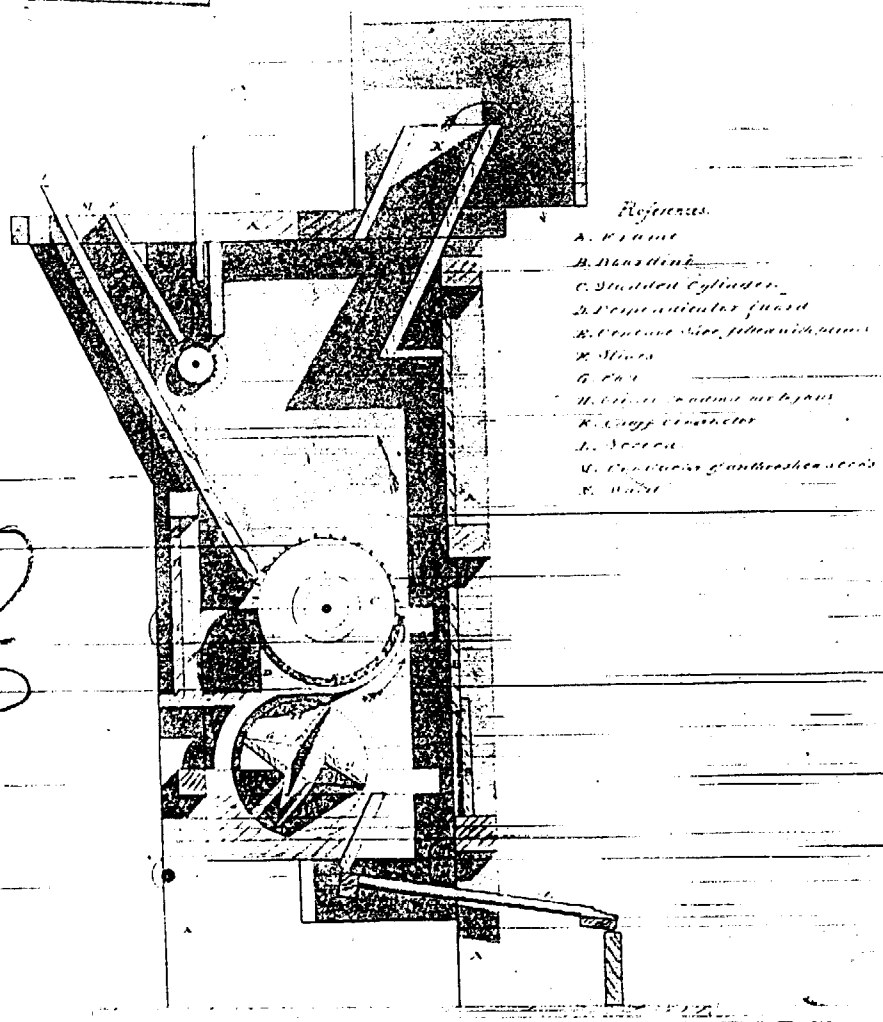
References.
A. Frame
B. Beaterline
C. Stationary Cylinder
D. Reciprocating Feeder
E. Centrical Sieve, filled with pins
F. Stirrers
G. Fan
H. Cylinder revolving on its axis
K. Chaff Crusher
L. Screen
M. Cylinder for threshing seed
N. Hopper
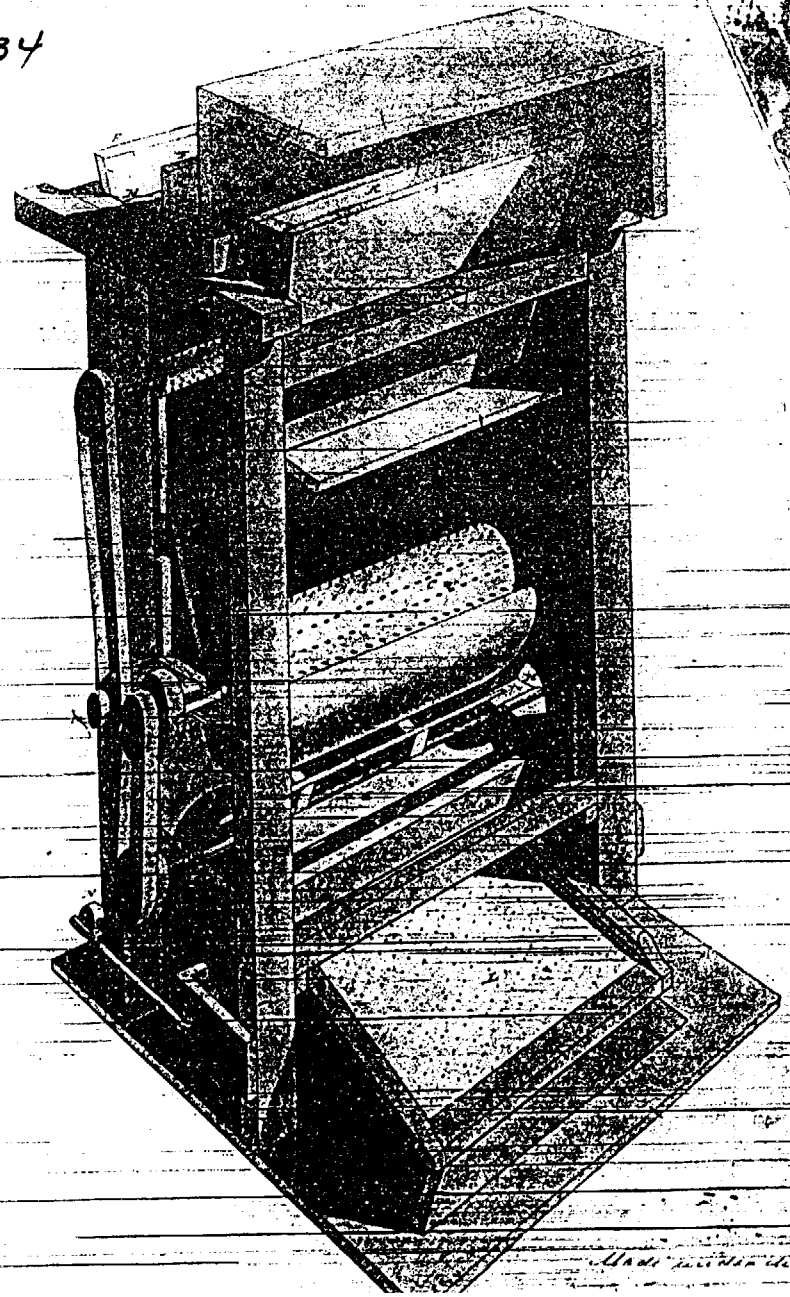
Note further description of this 8445 1/2 X Asa Barguss & Herman. Baldwin of
Washington, Litchfield County, State of Connecticut, Letters Patent.

The schedule referred to in these Letters Patent and making
part of the same containing a description in the words of the
said Asa Barges & Herman Baldwin themselves of their
improvement in the machine for thrashing and cleaning clover
and Timothy seed Be it known that we Asa Barges and Herman
Baldwin both of Washington in the County of Litchfield in
State of connecticut have invented a new and useful improve
ment in the machine for thrashing and cleaning Clover and
Timothy seed, and that the following is a full and exact des
cription of the construction and operation of sd machine and
specification of the said improvement therein The machine consists of an upright frame of
timbers about four inches square and seven feet three inches
high connected by girths of the same size and covered inside
of the posts with boards in pannels so as to form an upright
box three feet by two feet and a half in the clear from
top to bottom, on to the tops of these posts are framed two
timbers of the same size extending across the shortest side of
the top of the box and beyond the posts on the front side of
the machine two feet, the last mentioned timbers are connected
together at their outer ends by a cross timber of the same di
mensions, A cylinder of Wood or Iron two feet ten and
a half inches long, and eighteen inches in diameter filled
on its surface with metalic points or teeth one forth of an
inch long and one inch apart, set in the form of diamonds
is placed within said box with its axes on the cross timbers of the upright frame or box three feet and nine inches from the bottom
of said frame or box; The ends of the cylinder and the sides of the
box next to the ends of the cylinder are also filled with metalic
points in the same manner as the periphery of the cylinder;
Thin pieces of iron also project from the ends of the cylinder
about half an inch towards the sides of the box; They are
two inches long and run from the circumference in ob-
lique lines cutting segments of about one fifth of the circumference
of the cylinder, The object of these pieces of Iron being to throw
out of the space between the ends of the cylinder and the
sides of the box, the chaff and seed which would otherwise
accumulate there and clog the machine in its operation,
And it is to be understood that there are to be no points in
the sides of the box directly opposite to these pieces of iron,
The metalic points above mentioned are made of steel slightly
hooked flattened and brought to an edge, or of nails of the de-
nomination of six penny nails with small heads, or of steel wire
punched so as to resemble those sort of nails without heads or
in any similar manner, the inventor considers the kind first
above described as preferable to any other; A horizontal board
is fixed within the box about an inch and a half below the
line of the lower line of the cylinder and extending from the front
posts inward to a point half way between the perpendicular line of
the periphery and the line of the axis of the cylinder, and into
the inner edge of this board is fixed a perpendicular [illegible]
of steel one eighth of an inch thick extending along the whole
length of the cylinder, its upper edge being one eighth of an
inch distant from the points on the cylinder; Directly under the
cylinder along its whole length and from side to side of the box
is a concave shoe forming one third of a circle, its inner
surface filled with metalic points in the same manner as
the cylinder, Its distance from the cylinder directly under
the axis thereof is one inch from this point toward its [illegible]

8445½X edge as it approaches gradually nearer to the cylinder to the
distance of three fourths of an inch [illegible] the nearest place. The front or
lower edge of the shoe is attached to the under side of the
guard by hinges and is very nearly [illegible] to the horizontal line
of the axis of the cylinder. The shoe is held up in its place
by means of two arms of iron running [illegible] and
and bent so as to embrace its convex surface; the arms are
connected with the sides of the box near their middle by
pivots or pins under the lower edge of the guard, the outer end
of said arms being acted upon and pressed down by springs
attached to the sides of the box so as to keep the shoe in its
place and at the same time allow it to yield to any extraordinary
pressure which may be made upon it; or the shoe may
be made fast to the sides of the box. The upper edge of the shoe is
wrought down nearly to an edge so as to prevent the collection of
chaff or other substances, and to the whole length is fitted
a thin plate of iron which [illegible] horizontally towards the
cylinder one fourth of an inch [illegible] from the [illegible] of the
shoe just so far as the teeth [illegible] the shoe.

In order as much as possible to prevent the chaff and [illegible]
from falling into the space between the ends of the cylinder and the
sides of the box, circular rims are affixed to the sides of the box
covering the ends of the cylinder and allowing it to work freely un-
der [illegible] these rims; they are of sufficient breadth to cover
the space between the ends of the cylinder and the sides of the
box and about half an inch of the cylinder, and in case the
cylinder is hooped at its ends [illegible] the rims should also
cover the hoops. These rims are extended on their outer side
[illegible] down to the upper edge of the shoe, a space of about
two inches between them and the upper edge of the shoe being
left open to allow the chaff and seed which may get into
the space between the ends of the cylinder and the sides of
the box to work out again from the rims upward in the

8445½X direction of the orifice through which the unthrashed seed is introduced
into the machine the box is filled [illegible] with
boards equal to the thickness of the [illegible] that the longitudinal
sides of the opening for the admission of the unthrashed seed from the
top of the box quite down to the cylinder [illegible] equal
[illegible] The upright box is covered close at top and an orifice is
made for the introduction of the unthrashed seed just inside of the top
cross timber which projects over the point of the upright posts it is
eight inches wide quite across the box its outer edge is one foot
and six inches outside of the front posts a board one inch thick
forming the under side of a conductor from the top of the box on
the outer side of the orifice runs down obliquely towards the
cylinder in a line extended from the outside of the orifice to the
point of intersection made by the perpendicular line of the periphery
of the cylinder cutting the horizontal line of its axis on the
front side of the machine and terminating about two inches above
such point of intersection leaving the space between the end of
this board and the side of the cylinder about two inches wide
and the distance from the end of this board to the horizontal
line of the axis of the cylinder being also about two inches
A perpendicular moveable slide [illegible] through the
top of the box just inside of the front posts and [illegible] down to the
oblique board above described. These [illegible] oblique moveable
slide forming the upper side of the conductor for the unthrashed
seed. It runs from the top of the box [illegible] parallel with
the under side until it meets the perpendicular slide above men-
tioned making the conductor for the unthrashed seed about six inches
wide in the clear. There is a regulator inside of the box and
extending quite across it in the same direction with the cylinder
it is placed close to the perpendicular slide [illegible] attached at its
upper edge to the side of the box about one third of the distance
from the top of the box to the cylinder by pivots on which it turns
and it extends downwards so far when drawn out over the cylin-

8445½X its [illegible] [illegible] [illegible] from the cylinder. From
the middle of the regulator a shaft extends out over the cylinder
through the back [illegible] of the box by means of which the admission
of the [illegible] and dust [illegible] to the cylinder is regulated at
pleasure.
For the purpose of separating the seed from the chaff
and dust after having passed the cylinder a fly wheel eighteen inches
in diameter and two feet [illegible] inches long made and revolving
in a shoe or box like a common fanning mill is placed be-
low the cylinder so far as to revolve freely below that
of the cylinder. The [illegible] is [illegible] from the centre toward
the front part of the box two inches the opening [illegible]
for the escape of the wind is toward the back part and inside
of the upright box nearly on a level with the top. The wind
is admitted into the fly wheel box through circular
orifices eleven inches in diameter in the sides of the box
which are opened and closed by slides so as to regulate
the admission of wind in the fly wheel at pleasure.
The fly wheel with its shoe or box may also be placed out
side of the upright box directly over the [illegible] [illegible]
on the [illegible] of the upright box. The space between the
shoe of the cylinder and the back side of the box forming
the throat of the admission of the air from the fly wheel
to the chaff conductor is [illegible] four inches wide in the
clear quite across the box.
[illegible] the top of the upright box on the back
side thereof is introduced a conductor made of boards eight
inches wide in the clear and reaching quite across the up
right box [illegible] the [illegible] [illegible] [illegible] through this
conductor the chaff and dust when separated from the seed
is driven by the wind from the fly wheel [illegible] under and
outer [illegible] five feet and a half long [illegible] the box
on the back side thereof three feet and two tenths above the horizontal line of the axis of the cylinder and extends down
-ward in an oblique direction toward the top of the cylinder
one foot and eight inches from the place where it enters the
box, its lower end being [illegible] inches distant from back side
of box. From the top of the box it extends upwards and back
-wards in the same oblique direction as within the box three
feet and a half. The other three sides of the conductor rise
to the same height from the top of the box but do not enter it
at all. [illegible] the outer side of the sheet of the fly wheel when
[illegible] to permit the escape of the [illegible] hopper
filling the entire space between the [illegible] side of the box
and opening [illegible] through
which the [illegible] having passed the cylinder through the
current of air from the fly wheel is delivered onto the floor
below. The screen is put in motion by means of a wheel
ten inches in diameter and [illegible] connecting it with a
whirl on the end of the axis of the fly wheel properly geared
to give it the requisite motion. The sides and top and bottom
of the upright box are closed to prevent the escape of
the chaff and dust from the machine except through the
conductor provided for that purpose. The sides are frame
of panels of convenient size and conveniently [illegible]
and secured by pins or hinges and buttons so as to admit
of being easily removed and replaced when necessary for the
purpose of cleaning or repairing the machine or for other
purposes.

The machine is placed on the lower floor of a
two story building its top being [illegible] feet above the floor of
the second story. To the upper end of the perpendicular
slide above described which rises about three inches above
the box is attached a pulley which passes over a block
above and thence through the floor into the lower story 8445 [illegible]

by means of which the person in charge of the machine is enable[d]
to raise and lower the [illegible] [illegible] for the purpose of proper
-ly feeding the machine. The moving power may be that of
animals, water, steam [illegible] [illegible] in the usual way by
means of a drum, [illegible] and bands, or [illegible] which in such
manner and with such gearing that the cylinder shall
perform about eight hundred [illegible] in a minute. The
fly wheel may be propelled by the application of the same power
which drives the cylinder, or by an independent power, or pref
-erably [illegible] important that the wheel should [illegible] all
times [illegible] celerity which [illegible] [illegible] propelled
by means of gearing connected with the cylinder or propelling
power.
The last described [illegible] for the chaff and [illegible]
at the upper [illegible] [illegible] [illegible] the [illegible] [illegible]
[illegible] feet square [illegible] the floor of the [illegible] [illegible]
opening through the [illegible] of the building [illegible] [illegible]
in a perpendicular and then [illegible] a horizontal direction
and passing [illegible] [illegible] [illegible] [illegible] [illegible] [illegible]
rough board [illegible] [illegible] the [illegible] of the building half way
or more to the ground [illegible] [illegible] [illegible] [illegible]
perform the two [illegible] [illegible] [illegible] [illegible] [illegible] blowing
[illegible] [illegible] [illegible] [illegible] [illegible] [illegible] [illegible]
of chaff [illegible] [illegible] [illegible] [illegible] [illegible] the [illegible]
The velocity of the fly wheel [illegible] [illegible] [illegible] should
be about the same as that of the cylinder [illegible] the wheel
[illegible] [illegible] [illegible] [illegible] [illegible] may be increased
or diminished [illegible] [illegible] shall be found necessary.
The object [illegible] by the [illegible] [illegible] the fly
wheel [illegible] [illegible] head [illegible] [illegible] the machine
[illegible] [illegible] [illegible] [illegible] [illegible] [illegible] [illegible] revolution [illegible]
[illegible] [illegible] [illegible] [illegible] [illegible] [illegible] [illegible] dislodge
[illegible] their [illegible] and then to drive off through the conductor 7. 8445½X the chaff (6) and dust while the [illegible] [illegible] to fall in
to the hopper below [illegible] [illegible] [illegible] fly wheel
should not be [illegible] [illegible] [illegible] through
the conductor along with the chaff (6) and dust [illegible]
sweak [illegible] to [illegible] [illegible] considerable portion of the unbro-
ken heads of grass [illegible] fall down into the hopper.

That part of the machine which the inventors claim
as their improvement and new and for which they solicit
a patent consists of the conductor for the introduction of
the [illegible] and the [illegible] connected with
it. The regulator and the conductor for the chaff and
dust when separated from the seed and the peculiar man-
-ner in which these parts are placed with reference to each
other and to the rest of the machine and to the building
in which it is fixed. They also claim the peculiar
mode of introducing the current of air into the machine
at the back side of the cylinder as before set forth. And
the peculiar excellence of this improved machine consists
in this that it performs the work without inconvenience
to the person turning it, driving the whole of the chaff
and dust through the chaff conductor directly out of
the building.

The machine being thus completed & attached to
its propelling power and set in motion [illegible] heads
of grass [illegible] drawn from the floor of the barn [illegible] through
the hopper into the conductor and dropped into the cylinder
and passing [illegible] between the cylinders are [illegible] broke
and torn in pieces by the teeth. The seed [illegible] from the
[illegible] [illegible] and both seed and chaff are delivered from
the cylinder directly into the hopper [illegible] [illegible] air
[illegible] the full blast of wind from the fly wheel by which
the chaff and dust are forced [illegible] through the chaff
conductor and the [illegible] room above into the open air

8445½X on the outside of the building, while the seed falls down
through the hopper into and through the screen into the
floor below. As however some dust may remain with the
seed after this operation it may be necessary or expedient
to pass it through a common fanning mill in order to
make it perfectly clean. Should any unthrashed heads
of grass fall down through the hopper and pass off over the
sides of the screen, they are to be again put into and passed
through the machine.

The upright frame or box is fixed in its place
on the floor of the building by keys, cleets & weights so as
to render it immovable and firm. The dimensions of the
several parts of the machine may be increased in the same
relative proportions but cannot be materially diminished
without injury.

In testimony that the foregoing is a true
specification and description of the whole of said ma-
-chine and our improvements thereon we have hereunto
subscribed our names this 20th day of [illegible] A.D. 1835

Witnesses
H. M. Baldwin
David C. Sayre

Asa Barge
Herman Baldwin

366 [illegible]

([illegible])

Exd [illegible]